(12) United States Patent
Hong et al.

(10) Patent No.: US 9,245,179 B2
(45) Date of Patent: Jan. 26, 2016

(54) DRIVER RECOGNITION SYSTEM AND RECOGNITION METHOD FOR VEHICLE

(71) Applicant: Hyundai Motor Company, Seoul (KR)

(72) Inventors: Gi Beom Hong, Bucheon-si (KR); Sung Un Kim, Yongin-si (KR); Kwang Myung Oh, Daejeon (KR); Jungsang Min, Seoul (KR)

(73) Assignee: Hyundai Motor Company, Seoul (KR)

( * ) Notice: Subject to any disclaimer, the term of this patent is extended or adjusted under 35 U.S.C. 154(b) by 60 days.

(21) Appl. No.: 14/088,024

(22) Filed: Nov. 22, 2013

(65) Prior Publication Data

US 2014/0294240 A1 Oct. 2, 2014

(30) Foreign Application Priority Data

Mar. 29, 2013 (KR) .................. 10-2013-0034860

(51) Int. Cl.
*G06K 9/00* (2006.01)
*B60W 50/08* (2012.01)
*B60Q 1/00* (2006.01)

(52) U.S. Cl.
CPC ......... *G06K 9/00362* (2013.01); *B60W 50/085* (2013.01); *B60W 2540/28* (2013.01); *B60W 2540/30* (2013.01)

(58) Field of Classification Search
CPC ................. G06K 9/00; B60W 50/00
USPC ............................. 382/104; 340/439
See application file for complete search history.

(56) References Cited

U.S. PATENT DOCUMENTS 5,835,008 A * 11/1998 Colemere, Jr. ......... B60Q 1/441
340/439
2007/0013553 A1 * 1/2007 Galambos ................ 340/932.2

FOREIGN PATENT DOCUMENTS

| JP | 3203951 B2 | 9/2001 |
| JP | 3390036 B2 | 3/2003 |
| JP | 2006-123640 A | 5/2006 |
| JP | 2007-118861 A | 5/2007 |
| KR | 10-2012-0054739 A | 5/2012 |

* cited by examiner

*Primary Examiner* — Abolfazl Tabatabai
(74) *Attorney, Agent, or Firm* — McDermott Will & Emery LLP

(57) ABSTRACT

A driver recognition system for a vehicle includes a camera taking an image of a driver's foot, and a central processing unit receiving image information from the camera, analyzing the image information, and delivering a signal in accordance with an analyzed result. A control unit is installed to receive the signal delivered from the central processing unit and output a control command so as to set a driving environment and a driving mode in accordance with the received signal. A control execution unit operates in accordance with the command received from the control unit, and an operator set in accordance with the operation of the control execution unit.

11 Claims, 2 Drawing Sheets

DRIVER RECOGNITION SYSTEM AND RECOGNITION METHOD FOR VEHICLE

CROSS-REFERENCE TO RELATED APPLICATION

This application claims priority to and the benefit of Korean Patent Application No. 10-2013-0034860 filed in the Korean Intellectual Property Office on Mar. 29, 2013, the entire contents of which are incorporated herein by reference.

TECHNICAL FIELD

The present disclosure relates to a driver recognition system and a recognition method for a vehicle, and more particularly, to a driver recognition system and a recognition method that determine a driver or a drivers situation by recognizing shoes.

BACKGROUND

In general, a driver sets a driving mode and a driving environment depending on a situation.

In the related art, a method in which the driver selects the driving mode and the driving environment without using a driver recognition system was used. The method of the related art is inconvenient since the driver needs to directly select the driving mode and the driving environmet each time the driver is changed. Further, if a driver choose not to select the driving mode and the driving environment of a vehicle, driver's safety or satisfaction issue can be arisen.

In recent years, a study about a driver recognition system that automatically sets the driving mode and the driving environment by recognizing the driver has been actively developed to improve the driver's safety and satisfaction.

However, difficulties exist in developing the system that directly recognizes the driver in terms of cost and algorithm. Further, if the driver's situation cannot be accurately recognized even though the driver is accurately recognized, the driving mode and the driving environment to the driver's satisfaction may not be selected.

The above information disclosed in the Background section is only for enhancement of understanding of the background of the disclosure, and therefore, it may contain information that does not form the prior art that is already known in this country to a person of ordinary skill in the art.

SUMMARY

The present disclosure provides a driver recognition system and method for a vehicle that accurately recognize a driver and a driver's situation.

According to an exemplary embodiment of the present disclosure, a driver recognition system for a vehicle includes a camera taking an image of a fofot part of a driver, and a central processing unit receiving image information from the camera, analyzing the image information, and delivering a signal in accordance with an analyzed result. A control unit is installed to receive the signal delivered from the central processing unit and output a control command so as to set a driving environment and a driving mode in accordance with the received signal. A control execution unit operates in accordance with the command received from the control unit, and an operator sets in accordance with the operation of the control execution unit.

The central processing unit may include a determier to analyze the image information and determine information on the driver, and a deliverer to deliver a signal in accordance with the information on the driver.

The information on the driver may be classification of shoes.

The operator may be set so as to select a driving mode, in advance, in accordance with the classification of the shoes.

The image information may be information on the shoes, and the information on the driver may be information on an owner of the shoes, which is input in advance.

The operator may be set so as to change the driving environment in accordance with the information on the owner of the shoes.

According to another exemplary embodiment of the present disclosure, a driver recognition method for a vehicle through a driver recognition system, in which a camera takes an image of a driver's foot, and a driving environment and a driving mode are set in accordance with information on the picked-up image includes operating the driver recognition system recognizing shoes in accordance with the image information, generating and delivering a signal in accordance with information on the recognized shoes, commanding a control so as to set a driving environment and a driving mode in accordance with the delivered signal, and performing a control so as to set the driving environment and the driving mode in accordance with the command.

The method may further include determining classification of the shoes in accordance with the information on the recognized shoes.

The driving mode may be set in accordance with classification of the shoes.

An owner of the shoes may be recognized in accordance with the information on the recognized shoes.

The driving environment may be set in accordance with the information on the owner of the shoes.

The method may further include operating the driver recognition system, and terminating the driver recognition system, in which the operation and the termination of the driver recognition system may be performed by the driver's selection.

DETAILED DESCRIPTION

An exemplary embodiment of the present disclosure will hereinafter be described in detail with reference to the accompanying drawings.

Figure 1:
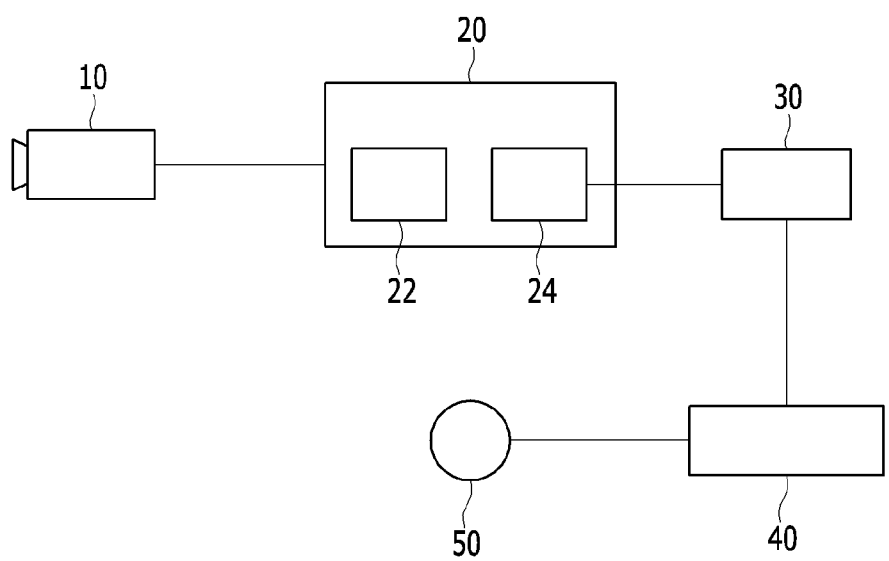
FIG. 1 is a configuration diagram of a driver recognition system for a vehicle according to an exemplary embodiment of the present disclosure.

FIG. 1 is a configuration diagram of a driver recognition system for a vehicle according to an exemplary embodiment of the present disclosure.

As illustrated in FIG. 1, the driver recognition system for a vehicle includes a camera 10, a central processing unit 20, a control unit 30, a control execution unit 40, and an operator 50.

The camera 10 takes an image of driver's shoes. The camera 10 may be mounted on a door of a driver's side or a lower side of a dashboard of the driver's side. The position of the camera 10 may be changed so as to easily take the image.

The central processing unit 20 receives image information from the camera 10, and recognizes the shoes in accordance with the received image information. Recognition of the shoes includes a process of classifying the shoes and determining the driver. The shoes may be determined as one group among groups classified as sneakers, shoes, and high heels which may be set by a user in advance. Information on shoes and an owner of the shoes are inputted into the central processing unit 20 in advance, through which the driver can be accurately recognized. Here, the central processing unit 20 generates a signal in accordance with the determined shoes and information on the driver.

The central processing unit 20 includes a determiner 22 and a deliverer 24. The determiner 22 is a section that classifies the shoes and determines the driver. The deliverer 24 generates a signal in accordance with the classified shoes and information on the driver and delivers the generated signal.

The control unit 30 receives the signal delivered from the deliverer 24, and outputs a control command so as to set the driving environment and the driving mode in accordance with the received signal. The control unit 30 may be a general electronic control unit (ECU) that controls electronic apparatuses, such as a navigator, a DMB, an audio system, etc. of the vehicle.

The control execution unit 40 sets the driving environment and the driving mode in accordance with the control command received from the control unit 30. The control execution unit 40 includes an actuator that adjusts angles of an accelerator pedal and a brake pedal or adjusts a position of a seat, a safety belt, or a handle. The control execution unit 40 further includes a device that sets sensitivity of the accelerator pedal, the brake pedal, the handle so as to switch the driving mode. The driving mode is selected according to the classified group of the shoes. For example, in the case of the shoes, the driving mode may be set as an echo mode, in the case of the sneakers, the driving mode may be set as a sport mode, and in the case of the high heels, the driving mode may be set as a safety mode. Setting the echo mode, the sport mode, or the safety mode may be defined by the user in advance.

The operator 50 sets all devices, such as the accelerator pedal, the brake pedal, the seat, the safety belt, and the handle that are operated by the control execution unit 40.

Figure 2:
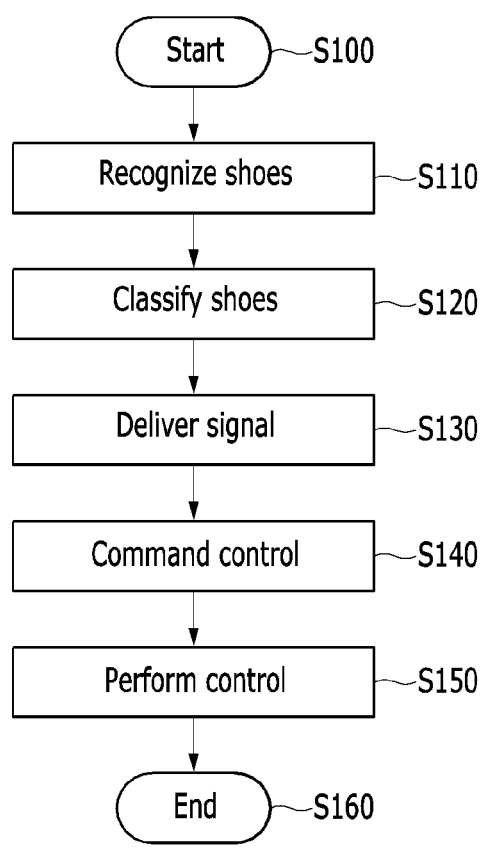
FIG. 2 is a flowchart of a driver recognition method for a vehicle according to another exemplary embodiment of the present disclosure.

FIG. 2 is a flowchart of a driver recognition method for a vehicle according to another exemplary embodiment of the present disclosure.

As illustrated in FIG. 2, when the driver recognition system for a vehicle is operated (S100), the central processing unit 20 recognizes shoes in accordance with an image of the shoes taken by the camera 10 (S110), and determines classification of the shoes in accordance with information on the recognized shoes (S120). In the recognizing of the shoes (S110), an owner of the shoes is input into data in advance, thereby the central processing unit 20 recognizes a driver.

When the shoes are recognized and the classification of the shoes is determined, the central processing unit 20 generates a signal in accordance with the information on the shoes and delivers the generated signal (S130) to the control unit 30.

After the signal is delivered from the central processing unit 20, the control unit 30 commands a control so as to set a driving environment and a driving mode in accordance with the received signal (S140). Further, the control execution unit 40 allows the operator 50 to set the driving environment and the driving mode in accordance with the command received from the control unit 30.

Once setting of the driving environment and the driving mode is completed, the driver recognition system for a vehicle is terminated (S160). Herein, the operation (S100) and the termination (S160) of the driver recognition system may be selectively performed by the driver.

Herein, setting of the driving environment means adjusting angles of an accelerator pedal and a brake pedal in accordance with information on the driver or adjusting a position of a seat, a safety belt, a mirror, or a handle. The information on the driver may be a body size of the driver. Setting of the driving mode means selecting one of modes which a user defines in advance, such as an echo mode, a sport mode, or a safety mode in accordance with classification of shoes.

The driver recognition system and method for a vehicle which take an image of shoes of the driver through the camera 10 and extract information may be extended to various technologies.

When the driver recognition system for a vehicle is associated with location based services (LBS), a guide depending on a driving purpose of the driver may be performed. For example, when hiking boots are recognized in recognizing the shoes, a guide such as recommending a hiking course, or the like may be performed.

When the driver recognition system for a vehicle is associated with a stereo, music may be played in accordance with a foot motion of a predetermined rule.

When the driver recognition system for a vehicle is designed to analyze a pedal handling habit of the driver, a correct pedal handling habit may be guided through a voice guide and display device.

The extension of the technological scope is achieved based on the driver recognition system for a vehicle which is mounted with the camera 10, signalizes and transfers information, and performs a control according to the transferred signal.

According to the exemplary embodiments of the present disclosure, as the shoes are recognized, an owner of the shoes is naturally recognized, and the driver may be accurately recognized. Accordingly, the driving environment may be set in accordance with information on the body of the driver, and safety may be secured. Further, the driving mode is selected depending on a type of the shoes to improve driver satisfaction.

While the present disclosure has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A driver recognition system for a vehicle, comprising:
a camera taking an image of a driver's foot;
a central processing unit configured to receive image information from the camera, configured to analyze the image information, and configured to deliver a signal in accordance with an analyzed result;
a control unit configured to receive the signal from the central processing unit and configured to output a control command to set a driving environment and a driving mode in accordance with the received signal;
a control execution unit configured to operate in accordance with the command received from the control unit; and
an operator configured to be set in accordance with the operation of the control execution unit,
wherein the central processing unit includes: a determiner configured to analyze the image information and determining information on the driver; and a deliverer configured to deliver a signal in accordance with the information on the driver, and wherein the information on the driver is classification of shoes.

2. The system of claim 1, wherein:
the operator is configured to be set to select one driving mode which is set in advance according to the classification of the shoes.

3. The system of claim 1, wherein:
the image information is information on the shoes, and
the information on the driver is information on an owner of the shoes, which is inputted in advance.

4. The system of claim 3, wherein:
the operator is set to change the driving environment in accordance with the information on the owner of the shoes.

5. The system of claim 1, wherein:
the control execution unit includes an actuator that adjusts angles of an accelerator pedal and a brake pedal or adjusts a position of a seat, a safety belt, or a handle.

6. The system of claim 1, wherein:
the control execution unit is configured to set sensitivity of the accelerator pedal, the brake pedal, and the handle to switch the driving mode.

7. A driver recognition method for a vehicle through a driver recognition system, in which a camera takes an image of a driver's foot, and a driving environment and a driving mode are set in accordance with information on the image taken, the method comprising:

recognizing shoes in accordance with the image information;
generating and delivering a signal in accordance with information on the recognized shoes;
commanding a control to set the driving environment and the driving mode in accordance with the delivered signal;
performing the control to set the driving environment and the driving mode in accordance with the command; and
determining classification of the shoes in accordance with the information on the recognized shoes.

8. The method of claim 7, wherein:
the driving mode is set in accordance with the classification of the shoes.

9. The method of claim 7, wherein:
an owner of the shoes is recognized in accordance with the information on the recognized shoes.

10. The method of claim 7, wherein:
the driving environment is set in accordance with the information on an owner of the shoes.

11. The method of claim 7, further comprising:
operating the driver recognition system; and
terminating the driver recognition system,
wherein the operation and the termination of the driver recognition system are performed by selection from the driver.

* * * * *